J. L. CHESNUTT.
SWIVEL CASTER.
APPLICATION FILED APR. 29, 1921.
1,392,911. Patented Oct. 11, 1921.
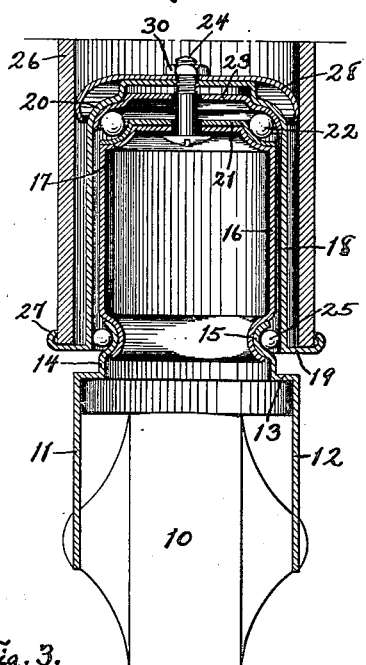
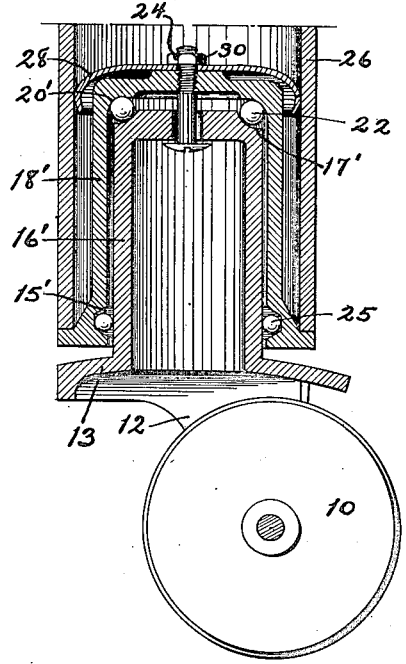
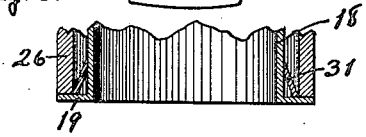
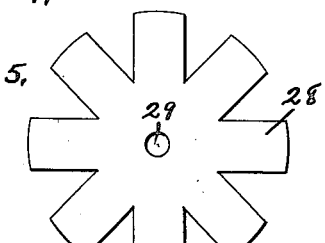
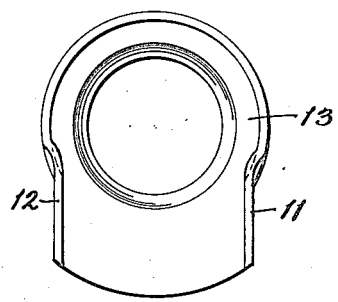
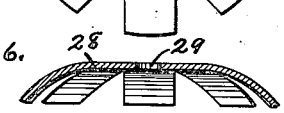
INVENTOR:
J. L. CHESNUTT
By Earl M. Sinclair
Atty.

UNITED STATES PATENT OFFICE.

JOHN LOUCIEN CHESNUTT, OF LONG BEACH, CALIFORNIA.

SWIVEL-CASTER.

1,392,911.  Specification of Letters Patent.  Patented Oct. 11, 1921.

Application filed April 29, 1921. Serial No. 465,586.

*To all whom it may concern:*

Be it known that I, JOHN LOUCIEN CHESNUTT, a citizen of the United States of America, and resident of Long Beach, Los Angeles county, California, have invented a new and useful Swivel-Caster, of which the following is a specification.

The object of this invention is to provide an improved construction for a swivel caster which may be formed of metal either by casting or by pressing and stamping, and designed especially for use on articles of furniture and the like.

A further object of this invention is to provide an improved swivel caster having a socket member adapted to be received within an object to be supported, a stem of relatively large diameter rotatably mounted in said socket, and vertically spaced rows of bearing balls arranged between said stem and socket, one row of balls being adapted to receive vertical pressure only and the other to receive lateral pressure only, thereby facilitating the swiveling operation.

A further object of this invention is to provide a swivel caster having a socket member and a stem received therein, and improved means for connecting said stem and socket to eliminate friction in the swiveling operation.

A further object of this invention is to provide an improved swivel caster having a socket member and a stem rotatably mounted therein, bearing balls to receive vertical pressure through said socket member upon said stem, and wear plates fitted to the adjacent ends of the stem and socket member and forming raceways for said balls, thereby increasing the wearing quality, adding strength, and facilitating the operation of assembling the parts.

A further object of this invention is to provide a swivel caster having a socket member, a stem rotatably mounted therein, and means for retaining said socket member in an aperture in an object to be supported and for connecting said socket member to said object.

A further object of this invention is to provide an improved socket and stem swivel caster having parts separably connected to facilitate replacement of worn or broken parts and to permit refilling of grease chambers.

A further object of this invention is to provide an improved socket and stem swivel caster having ample chambers for lubricating grease for the balls and races, insuring constant lubrication over long periods, thus facilitating swiveling and lengthening the life of the wearing parts.

A further object of this invention is to provide an improved socket and stem swivel caster having two spaced rows of bearing balls, one of which receives vertical pressure only and the other lateral pressure only, thus materially increasing the life of the balls and raceways by decreasing the wear due to balls rotating under both lateral and vertical strains.

A further object of this invention is to provide an improved socket and stem swivel caster having socket and stem of relatively large diameters, thereby permitting ball raceways of large diameter, thus decreasing friction and facilitating the swiveling operation, and also permitting the use of a large number of bearing balls so as to increase the wearing surfaces.

A further object of this invention is to provide an improved socket and stem swivel caster having a stem of relatively large diameter, thus providing strength at the base where said member is subjected to severe strains in use.

A further object of this invention is to provide an improved socket and stem swivel caster having improved means for centering the socket in a load object and retaining it rigidly in perpendicular position.

A further object of this invention is to provide an improved socket and stem swivel caster with so little friction between the parts that the axle of the supporting wheel may be set quite close to the vertical axis of the device, thus reducing strain and wear on the parts under a load, especially during lateral motion when the wheel strikes an obstruction and tends to bend or break, and yet swiveling is automatically induced.

A further object of this invention is to provide an improved socket and stem swivel caster for use on house and office furniture and the like, of the highest possible swiveling efficiency, simple in construction and inexpensive in operation and maintenance, at a marketable price.

A further object of this invention is to provide an improved socket and stem swivel caster combining strength and simplicity of construction, so adding to length of life of the caster, decreasing tendency to get out of order, and being less complicated and expensive to manufacture and assemble.

With these and other objects in view, my invention consists in the construction, arrangement and combination of elements hereinafter set forth, pointed out in my claims and illustrated by the accompanying drawing, in which—

Figure 1 is a vertical section illustrating one form of my improved swivel caster in position for practical use.

Fig. 2 is a vertical section of a modified form, the wheel yoke and wheel being shown at right angles to the position of Fig. 1.

Fig. 3 is a fragmentary vertical section showing a further modified form of centering and retaining means between the socket member and object to be supported.

Fig. 4 is a bottom plan of the wheel yoke shown in Fig. 1.

Fig. 5 is a plan and Fig. 6 a vertical section of a resilient retaining member employed between the upper portion of the socket member and the object to be supported.

In the construction of the device as shown the numeral 10 designates a supporting wheel which may be of any suitable form and construction, such for instance as is illustrated, described and claimed in my companion application filed on even date herewith Serial No. 465,587, to which reference hereby is made. The wheel 10 is rotatably mounted between spaced parallel wings 11, 12 of a yoke or wheel supporting member, and said yoke is formed at its upper end with a horizontal portion or plate 13 connecting the upper portions of said wings. The yoke may be formed of metal by stamping and pressing, as shown in Fig. 1, or by casting as shown in Fig. 2. In either event the wings 11, 12 are shaped and arranged, and the wheel 10 so positioned, that said wheel trails relative to the vertical axis of the caster in use; and the horizontal portion 13 or plate preferably is extended in one or more directions beyond the margins of the wings, and in overhanging relation to the wheel, to strengthen and reinforce the wings in supporting a load object.

In the construction according to Fig. 1 the plate 13 is formed with a relatively large aperture in its central portion, and the metal around said aperture is turned upwardly at right angles to form an upstanding flange 14 circumferentially of said aperture. The upper portion of the flange 14 is pressed into curved form to produce a ball race 15 concaved on its outer face. A stem member is provided and preferably is formed of a separate piece of metal pressed to tubular form of substantially the same diameter as the circumferential flange 14, and said member is indicated generally by the numeral 16. At its lower end the stem member 16 is pressed inwardly and formed on a curve to fit snugly within the curved portion of the flange 14 forming the ball race 15, whereby the stem member is secured to said flange in such manner as to extend upwardly from the wheel yoke. The stem 16 is closed at its upper end and circumferentially of said upper end is formed with a concaved portion 17 providing a ball race. A tubular socket member 18 is separately formed and is of a diameter somewhat greater than and adapted to receive loosely the stem 16. The socket member 18 is open at its lower end and in use and when the parts are assembled it terminates a short distance above the plate 13 of the wheel yoke, providing a clearance for swiveling of the said yoke, without frictional contact. At its lower end the socket member 18 may be formed with an integral, outturned horizontal flange 19 spaced above and extending in some directions beyond the plate 13 of the wheel yoke. The socket member 18 is closed at its upper end, which is spaced above the end of the stem 16, and is bent, pressed and formed to provide an internal concavity or ball race 20 circumferentially of the interior of said closed upper end. If desired, or deemed necessary, a separate wear plate or disk 21, formed of hardened metal and having superior wear-resisting qualities, may be provided to overlie the upper end of the stem 16 and be shaped to fit said upper end in both its plane portion and the ball race 17 formed therein, in which event said plate or disk would take the actual wear of a series of balls such as 22 provided between the stem and socket member. Also a similar wear plate or member 23 is provided to fit within the upper end of the socket member 18 and the ball race 20 thereof. The upper ends of the stem 16 and socket member 18 are formed with circular holes on the vertical axis of the device, and the wear plates 21 and 23, when used, also are formed with holes in registry therewith. The holes in the stem 16, and wear plates are of materially larger diameter than the hole in the socket member 18, which latter hole is tapped to receive a machine screw 24 passed upwardly through the holes in the stem, and wear plates loosely and freely, and serving as a means for securing the stem in the socket member, and also permitting separation for replacement of parts when necessary.

A series 25 of bearing balls is mounted between the ball race 15 (which really is a part of the stem) and the smooth inner surface of the lower portion of the socket member 18.

The numeral 26 designates a portion of the object to be supported, and may be the hollow leg of an article of furniture, as shown, or it may be the body portion of an object such as a refrigerator, formed with an aperture or socket to receive the caster members. In either event the socket member 18 and stem 16, is assembled form, are mounted in the hollow object 26, the socket or aperture of which is of somewhat greater diameter than said socket member 18, and of sufficient depth to receive said members freely. The flange 19 of the lower end of the socket member 18 contacts the lower surface of the object 26, and when said object is a leg, as indicated, said flange may be formed with a peripheral cupped portion 27 snugly embracing the outer surface of said leg, said flange forming a closure for the lower end of the socket or aperture in said object. Or when the object has a larger plane lower surface surrounding the socket or aperture, the flange 19 would be plane and would contact such surface, and if desired could be formed with holes to receive screws or other means for securing the caster to the object.

A retaining member 28 is provided and is of resilient character and is mounted on the upper end of the socket member 18. The member 28 may be formed of a disk of resilient metal pressed to dome shape as shown in Fig. 6, and also formed with a number of peripheral V-shaped notches to form a plurality of radiating arms. The retaining member is formed with a central hole 29 to receive the bolt 24, and said member is of a diameter greater than the socket or aperture in the object 26 and is introduced thereto forcibly, creating tension in the radiating arms of said member and increasing the curvature thereof, said arms when in place curving downwardly in contact with the inner surface of the aperture of the object 26. It is the function of the resilient retaining member 28 to assist in holding the caster socket and stem in place in the object, and to prevent tipping of the caster under lateral strain in all directions.

The balls 22 receive downward pressure only, that is to say they carry the weight of the load imposed by the object 26 and members carried thereby; and such pressure is exerted obliquely on lines of approximately forty-five degrees to the axis of the stem, so that the balls are induced to roll in one direction only. That is to say, there is never present a plurality of forces working in opposite directions on said balls and tending to cause them to rotate simultaneously on more than one axis, so that friction and wear are reduced to a minimum.

Similarly the balls 25 receive lateral pressure only, exerted substantially at right angles to the axis of the stem, and it is their function to cause easy turning and swiveling of the stem and wheel yoke relative to the socket member 18 and load.

In Fig. 2 the wheel yoke is shown as cast integrally and the stem 16' is integral with said yoke. In this form the stem is shown as smooth on its outer surface adjacent the bearing balls 25, which are located in a peripheral groove or raceway 15' formed in the inner surface of the lower end of the socket 18'. In this view the wear plates 21, 23 are omitted and the bearing balls 22 contact directly with the raceways 17' and 20' formed in the stem 16' and socket member 18'. Any desired means may be employed to secure the flange 19 of this form to the lower end of the object 26.

Attention is called to the fact that in the forms of both Figs. 1 and 2 the lower bearing balls 25 between the stem and socket member are carried in a groove or raceway of one member and contact with a smooth surface of the other member. By this arrangement there can be no pinching or binding of the balls because of strain being applied vertically as well as laterally, and there can be no tendency of the balls to rotate on more than one axis at a time, thus making for free and easy motion and eliminating friction to the last possible degree. Because of one of the walls being smooth as above set forth, the operation of assembling also is facilitated.

The head of screw or bolt 24 preferably does not contact the upper end of the stem 16 or 16', thus further eliminating friction, but said member serves merely to retain the stem relative to the socket member; and a nut 30 threaded on the upper end of said screw or bolt serves as a locknut to prevent said member becoming loose in its seat in the top of socket member and also serves to retain the resilient retaining member 28 in place.

The balls 25 are placed as near as possible to the lower ends of the stem and socket members, and the balls 22 are spaced above them a distance preferably corresponding approximately to the distance of the first balls above the axle of the wheel 10. This tends to reduce friction and wear and to decrease the leverage, or equalize it, when during lateral motion the wheel strikes an obstacle or force is exerted laterally to move the object in any direction.

The length and relatively large diameter of the stem also add strength and durability and increase the bearing surface of the antifriction balls. The axle of the wheel is placed off-center relative to the vertical axis of the device to make it swivel automatically and as this brings the axle almost directly beneath the ball races there is comparatively little lateral pressure on the upper balls 22 and the stem is maintained in its proper perpendicular and central position, without tipping.

The use of the upper wear plate or lining member 23 facilitates assembly of the device by serving as a means to retain the balls 22 on the upper end of stem while the socket member is lowered to position thereon and the bolt or screw 24 placed in its seat.

It should be noted that the stem 16 might be formed integrally on the wheel yoke even when the device is made by pressing and stamping, but it is believed the construction shown and described in connection with Fig. 1 is more satisfactory and economical where the device is made of sheet metal.

In Fig. 3 is shown an auxiliary centering means where the flange 19 of the socket member is plane throughout its width and the cup flange is not employed. This involves a disk 31 of annular form pressed down tightly into position on and fitting the lower end of the socket member just above the flange thereof, and contacting at its outer margins the inner wall of the aperture in the object 26.

It is obvious that other means may be employed for centering and securing the socket member or other portions of the caster to the object to be supported, and that the device may readily be adapted for use on various types of objects or articles to be supported, such as plane surfaces, of refrigerators and the like, wooden legs of various articles of furniture, or metal angle iron legs of washing machines or other light machinery.

As shown in Figs. 1 and 4 the wings 11, 12 of the wheel yoke, when stamped, are offset and flare somewhat between the ends and blend and merge from their plane lower surfaces into the circular body portion of the upper end of the yoke with its depending peripheral flange, designated by the numeral 32 in said view.

The space between the stem and socket member may be employed to retain grease, hard oil or other lubricating medium to further facilitate the swiveling operation and increase the life or usefulness of the device, which medium may be renewed by separation through removal of screw 24.

The caster is practically dirt-proof, as it is entirely closed against entrance of foreign substances from above to its movable parts, and the only possible point of entry is the laterally opening, relatively narrow space between the flange 19 of the socket member and the horizontal part 13 of the wheel yoke, the flange overhanging and projecting in most if not all directions beyond said horizontal part.

The relatively large diameter of the stem provides strength at its base where stem casters often bend when the wheel or yoke strikes a serious obstruction, and also permits the use of ball races of large diameter, with more balls, consequently increasing the wearing surfaces, decreasing friction, facilitating swiveling and lengthening the life of the device.

It is important that the socket be properly centered and the stem held rigidly in vertical position, as otherwise the swiveling operation cannot be consummated without lifting the load, and often the wheel slides on and wears or mars the floor on which it is traveling.

The superior swiveling qualities of this caster also permit the supporting wheel 10 to be set a minimum distance to the rear of the vertical center, thus reducing friction and wear. In other words the swiveling operation is accomplished so easily and readily that the wheel need not be set far back in order to lend aid in inducing the swiveling operation.

I claim as my invention—

1. A swivel caster, comprising a wheel yoke, a wheel journaled therein, a stem extending upwardly from said yoke, a socket member closed at its upper end and fitting loosely over said stem, means for retaining said stem in said socket member and permitting relative rotary movement of said members, a series of bearing balls between the upper ends of said stem and socket member receiving vertical pressure only, a series of bearing balls between the lower end portions of said stem and socket member receiving lateral pressure only, and means for securing said socket member to a load object.

2. A swivel caster, comprising a wheel yoke, a wheel journaled therein, a stem extending upwardly from said yoke, a socket member closed at its upper end and fitting loosely over said stem, means for retaining said stem in said socket member and permitting relative rotary movement of said members on a vertical axis, a series of bearing balls between the upper ends of said stem and socket member receiving downward pressure only, a series of bearing balls between the sides of the lower end portions of said stem and socket member receiving lateral pressure only, said socket member adapted to be received within an apertured load object, said socket member being flanged at its lower end and adapted to be secured and centered relative to said load object by said flange circumferentially of the aperture therein, and resilient means carried by the upper end of said socket member and adapted to contact the inner wall of the aperture of said load object.

3. A swivel caster, comprising a wheel yoke, a wheel journaled therein, a stem of relatively large diameter formed on and extending upwardly from said yoke, a socket member closed at its upper end and fitting loosely over said stem, a securing member extending loosely through the upper end of said stem and threaded into the upper end of said socket member, a series of bearing balls between the upper ends of said stem and socket member receiving downward pressure only, a series of bearing balls between the sides of the lower end portions of said stem and socket member contacting a peripheral groove in one of said members and a smooth surface of the other, said socket member adapted to project upwardly into an aperture in a load object, a resilient retaining member carried by the upper end of said socket member and adapted to contact the walls of said aperture, and means for centering and securing the lower end of said socket member to the load object.

4. A swivel caster, comprising a wheel yoke, a wheel journaled therein, a hollow stem of relatively large diameter and closed at its upper end projecting upwardly from said yoke, a socket member closed at its upper end fitting loosely over said stem, a securing member passing freely through and axially of the upper end of said stem and threaded into the upper end of said socket member, said stem and socket member being formed with coacting peripheral grooves at their upper ends, a series of balls in said grooves, a series of balls between the lower end portions of said stem and socket member carried by a circumferential groove in one of said members and contacting a smooth wall of the other, and means for centering and securing said socket member relative to a load object.

5. A swivel caster, comprising a wheel yoke, a wheel journaled therein, a stem of relatively large diameter projecting upwardly from said yoke, said stem being hollow and closed at its upper end, a socket member fitting loosely over said stem, a retaining member passing loosely and freely through and centrally of the upper end of said stem and threaded into said socket member, said stem and socket member being formed with coacting peripheral grooves at their upper ends, a wear plate or lining pressed into the groove of the socket member, a series of balls in the groove of said stem contacting said wear plate or lining, said wear plate or lining serving also as a retainer for said balls in assembling the parts, and means for centering and securing said socket member relative to a load object.

6. The combination with a load object formed with a downwardly opening aperture, of a swivel caster comprising a wheel yoke, a wheel journaled therein, a stem formed on and projecting upwardly from said yoke, a socket member fitting loosely over said stem, means for securing said stem and socket member together whereby relative rotary movement is permitted on a vertical axis, vertically spaced rows of bearing balls between said stem and socket member, one row receiving downward pressure only and the other receiving lateral pressure only, said socket member being formed at its lower end with a peripheral flange adapted to contact the lower surface of said load object circumferentially of the aperture therein, and a resilient member carried by the upper end of said socket member engaging the inner wall of said aperture and preventing tipping of the socket member and stem therein.

Signed at Des Moines, in the county of Polk and State of Iowa, this 8" day of April, 1921.

JOHN LOUCIEN CHESNUTT.